United States Patent [19]

Cuschera

[11] 4,332,393
[45] Jun. 1, 1982

[54] SELF CONTAINED SEAL FOR DRAINS

[76] Inventor: Casper Cuschera, 1047 77th Ave., Oakland, Calif. 94621

[21] Appl. No.: 190,919

[22] Filed: Sep. 26, 1980

[51] Int. Cl.³ .......................... F16L 21/04; E03C 1/26
[52] U.S. Cl. ........................................ 277/112; 4/420; 4/252 R; 4/292; 285/196
[58] Field of Search .................. 285/162, 56, 196, 338; 277/207 A, DIG. 2; 4/252 R, 420, 295, 286, 288, 292, 291

[56] References Cited

U.S. PATENT DOCUMENTS

| | | |
|---|---|---|
| 1,503,421 | 7/1924 | Innes . |
| 1,994,789 | 3/1935 | Redmond et al. . |
| 2,444,340 | 6/1948 | Donahue . |
| 3,393,409 | 7/1968 | Politz . |
| 3,414,273 | 12/1968 | Summen .......................... 4/252 R |
| 3,420,552 | 1/1969 | Mork et al. . |
| 3,481,632 | 12/1969 | Suess . |
| 3,579,670 | 7/1971 | Frank . |
| 3,668,718 | 6/1972 | Cuschera . |
| 3,703,302 | 11/1972 | Demler . |
| 3,896,511 | 7/1975 | Cuschera . |
| 3,967,326 | 7/1976 | Tammen ............................. 4/420 |
| 4,059,289 | 11/1977 | Morris et al. . |
| 4,061,344 | 12/1977 | Bradley et al. ..................... 285/196 |
| 4,092,745 | 6/1978 | Oropallo . |

Primary Examiner—Robert I. Smith
Attorney, Agent, or Firm—Harris Zimmerman; Howard Cohen

[57] ABSTRACT

A self contained sealing arrangement for drains and pipe connections includes a sleevelike, cylindrical sealing gasket having a plurality of annular ribs disposed on the inner and outer surfaces thereof and spaced longitudinally therealong. A pair of compression rings are disposed at opposed ends of the sealing gasket, each ring impinging upon its respective end surface of the gasket. A plurality of screw holes extend through one ring and also longitudinally through the sealing gasket, and are aligned with a like plurality of tapped holes in the other ring. A like plurality of screws extend through the first ring and the gasket and are secured in the tapped holes of the other ring. The gasket assembly is received about a pipe end disposed within a drain body or pipe connection, and is situated in the annular space defined by the outer surface of the pipe end and the inner surface of the drain or pipe connection. The screws may be tightened in their respective tapped holes to compress the sealing gasket longitudinally, causing radial expansion of the gasket inwardly and outwardly to effect a seal between the pipe and the drain or pipe connection.

2 Claims, 3 Drawing Figures

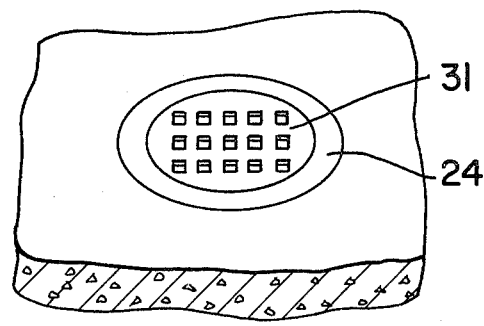
FIG_1
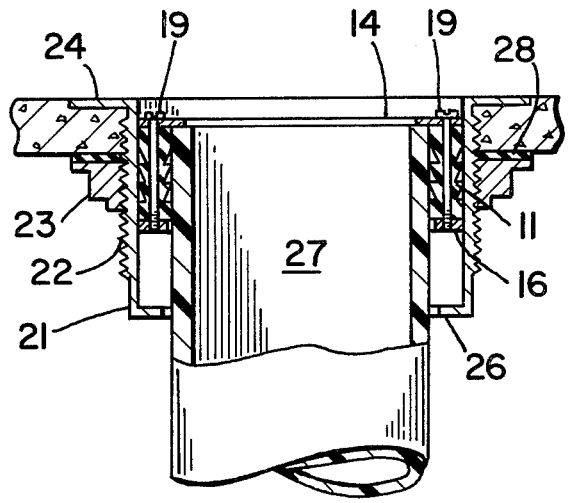
FIG_2
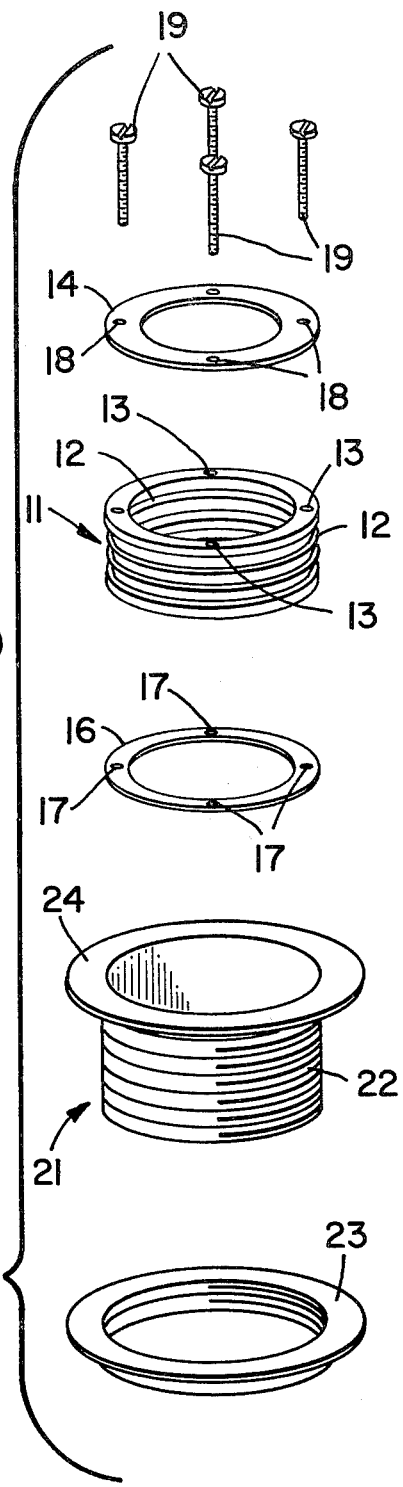
FIG_3

SELF CONTAINED SEAL FOR DRAINS

BACKGROUND OF THE INVENTION

The following United States Patents comprise the closest known prior art:
U.S. Pat. No. 1,994,789
U.S. Pat. No. 3,420,552
U.S. Pat. No. 2,444,340
U.S. Pat. No. 1,503,421
U.S. Pat. No. 3,393,409
U.S. Pat. No. 3,668,718
U.S. Pat. No. 3,579,670
U.S. Pat. No. 3,896,511
U.S. Pat. No. 3,703,302
U.S. Pat. No. 4,092,745
U.S. Pat. No. 3,481,632
U.S. Pat. No. 4,059,289

As shown in the references enumerated above, the prior art discloses various arrangements for securing and sealing a pipe within a drain body or the like. Many of these prior art arrangements employ a resilient gasket which is interposed between the pipe and the drain to effect a seal therebetween.

Generally speaking, the gasket arrangements known in the prior art are designed for use in conjunction with specific drain components, pipe connections, or the like. Thus each gasket arrangement is unique, and the various gasket arrangements are not interchangeable among the various drain devices which are currently commercially available. As a result, the economies of scale known to standardized, mass produced items in the plumbing field and other fields have not been available to self-sealing drain devices and the like which employ resilient gasket assemblies.

SUMMARY OF THE INVENTION

The present invention generally comprises a self-contained sealing gasket assembly which is adapted to be used as a standardized component in a wide variety of drain connections, pipe connections, and the like. The assembly of the present invention includes a pair of compression rings, each provided with a large bore extending axially therethrough. One of the rings is provided with a plurality of screw holes extending parallel to the axis thereof, while the other ring is provided with a like plurality of tapped holes positioned in alignment with the screw holes of the other ring.

The pair of rings are spaced apart in the axial dimension, and a sleeve-like sealing gasket is disposed therebetween. The gasket includes a plurality of annular ribs on the inner and outer surfaces thereof and spaced longitudinally therealong. The gasket also includes a like plurality of screw holes which are aligned with the holes in the rings. A like plurality of screws extend through one ring and through the gasket and are secured in the tapped holes of the other ring.

The gasket assembly is disposed to circumscribe the end of a pipe which is received within a drain fitting or the like. The gasket assembly is situated in the annular space defined by the inside surface of the drain fitting and the outer surface of the end of the pipe.

The screws are tightened in their respective tapped holes, causing the compression rings to translate axially together. The sealing gasket is thus longitudinally compressed by the compression rings, and as a result it is forced to expand radially both inwardly toward the pipe and outwardly toward the drain fitting. The annular ribs of the sealing gasket thus are driven with great force to impinge upon the confining surfaces of the pipe and drain fitting, thereby effecting a fluid tight, leak proof seal therebetween.

BRIEF DESCRIPTION OF THE DRAWING

FIG. 1 is a top perspective view of a drain employing the self contained sealing gasket assembly of the present invention.

FIG. 2 is a cross-sectional elevation of a typical drain fitting employing the self contained sealing gasket assembly of the present invention.

FIG. 3 is an exploded view of the components of the sealing gasket assembly of the present invention, together with a typical drain fitting in which it is used.

DESCRIPTION OF THE PREFERRED EMBODIMENT

With reference to the accompanying figures, and in particular FIGS. 2 and 3, the self contained sealing gasket assembly of the present invention includes a generally cylindrical, sleeve-like sealing gasket 11 formed of a resilient substance such as a neoprene rubber or the like. The gasket 11 is provided with a plurality of annular ribs 12 disposed on the interior and exterior surfaces thereof and spaced axially therealong. A plurality of screw holes 13 extend longitudinally through the gasket 11 parallel to the axis thereof.

The invention also includes a pair of compression rings 14 and 16, each having an outer diameter substantially the same as the outer diameter of the gasket 11. The ring 16 has an inner diameter substantially the same as the inner diameter of the gasket 11, and the ring 14 has in inner diameter somewhat less than the inner diameter of the gasket 11, for purposes which will be explained in the following description. The compression ring 16 includes a quartet of tapped holes 17, and the compression ring 14 includes a quartet of screw holes 18. The tapped holes 17, the screw holes 13, and the screw holes 18 are all positioned for mutual alignment.

The invention also includes a quartet of screws 19 which are received through the screw holes 18 and the screw holes 13 to be threaded in the tapped holes 17 of the ring 16.

The self contained sealing gasket assembly, comprising the gasket, the two compression rings, and the four screws, is adapted to be used in conjunction with a drain fitting or pipe connection. A typical drain fitting includes a generally cylindrical drain body 21 having external threads 22 on which an external nut 23 is secured. The drain body 21 includes an upper flange 24 extending radially outwardly therefrom and adapted to be received in an annular recess disposed about a drain hole in a floor, tub, sink, shower assembly, or the like. The drain body 21 also includes an inner flange 26 extending radially inwardly from the lower edge thereof. The flange 26 defines a lower bore opening through which extends the upper end of a waste discharge pipe 27. The nut 23 is tightened on the threaded portion 22 to engage compressively the edge of the drain opening between the upper flange 24 and an external sealing ring 28. Such arrangements are well known in the prior art.

The self contained sealing gasket assembly of the present invention is received about the upper end of the waste discharge pipe 27, circumscribing the upper end of the pipe. The gasket and ring 16 are dimensioned to be received in the annular space defined by the inner bore of the drain body 21 and the outer surface of the upper end of the waste discharge pipe 27. The bore of the upper ring 14 is slightly less in diameter than the outside diameter of the waste discharge pipe 27. As a result, the ring 14 rests upon the upper edge of the pipe 27, preventing the assembly of the present invention from being inserted into the annular space beyond the upper edge of the pipe 27.

To effect a seal between the pipe 27 and the drain body 21, the screws 19 are tightened in the threaded holes 17, drawing together the compression rings 14 and 16. This action compresses the sealing gasket 11 in the axial direction, causing the resilient material thereof to expand in the radial direction both inwardly and outwardly. As a result, the annular ribs 12 are driven to impinge upon the inner and outer surfaces of the drain fitting and pipe, respectively, thereby effecting a fluid tight and leak proof seal therewith.

It may be appreciated that the assembly of the present invention, comprising the compression rings, the gasket 11, and the screws 19, may be sold and distributed in assembled condition as a single unit. The assembly of the present invention may be provided with inner diameter dimensions which are adapted to suit standard diameter waste discharge pipes, while the outer dimensions of the components are suited to standard drain bodies known in the prior art. Thus the assembly of the present invention may be adapted for use with many combinations of drain fittings and waste discharge pipes. As a result, the invention may be produced in large quantities and thus may be sold inexpensively to the public. Furthermore, unlike prior art caulking arrangements, the sealing system of the present invention may be disassembled easily for maintenance and repair of the plumbing system without damage to the components of the invention and without requiring replacement of the components for resinstallation of the drain.

As shown in FIG. 1, a strainer unit 31 may be placed in the upper opening of the drain fitting 21 to prevent large objects from entering the drain pipe and blocking the system. Such strainer units are known in the prior art.

I claim:

1. A self-contained gasket sealing assembly for a pipe end portion received within a pipe fitting with an annular space therebetween, comprising; a cylindrical, sleeve-like gasket received about said pipe and disposed within said annular space, a plurality of holes extending longitudinally through said gasket parallel to the axis thereof, a pair of compression rings disposed at opposed ends of said gasket, one of said rings having an inner diameter sufficient to receive said pipe end portion and an outer diameter less than the diameter of said annular space, said one ring including a like plurality of tapped holes, the other of said rings having an inner diameter less than sufficient to receive said pipe end portion and adapted to abut the end surface thereof, said other ring including a like plurality of screw holes therethrough, and screw means for extending through said holes of said other ring and gasket and engaging said tapped holes of said one ring for compressing said gasket longitudinally to effect radial expansion of said gasket and a sealing engagement of said gasket with the outer surface of said pipe and the inner surface of said pipe fitting.

2. The assembly of claim 1, further including a plurality of annular ribs disposed on the inner and outer surfaces of said gasket and spaced longitudinally therealong.

* * * * *